United States Patent
Yamada (10) Patent No.: US 7,837,382 B2
(45) Date of Patent: Nov. 23, 2010

(54) FIXED-POINT CELL, FIXED-POINT TEMPERATURE REALIZING APPARATUS, AND METHOD OF THERMOMETER CALIBRATION

(75) Inventor: Yoshiro Yamada, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 457 days.

(21) Appl. No.: 12/083,236

(22) PCT Filed: Aug. 23, 2006

(86) PCT No.: PCT/JP2006/316490

§ 371 (c)(1),
(2), (4) Date: Apr. 8, 2008

(87) PCT Pub. No.: WO2007/043244

PCT Pub. Date: Apr. 19, 2007

(65) Prior Publication Data

US 2008/0317088 A1  Dec. 25, 2008

(30) Foreign Application Priority Data

Oct. 14, 2005  (JP)  .............................. 2005-300011

(51) Int. Cl.
*G01K 15/00* (2006.01)
(52) U.S. Cl. ................ 374/1; 374/2; 374/129; 374/208
(58) Field of Classification Search .............. 374/1, 374/2, 129, 100, 208
See application file for complete search history.

(56) References Cited

U.S. PATENT DOCUMENTS

| 6,398,405 | B1 | 6/2002 | Yamada |
| 6,641,299 | B2 | 11/2003 | Sasajima et al. |
| 7,063,457 | B2 * | 6/2006 | Kang et al. ................. 374/3 |
| 7,585,106 | B2 * | 9/2009 | Yamada et al. ............. 374/2 |
| 7,677,794 | B2 * | 3/2010 | Kim et al. ................. 374/1 |

(Continued)

FOREIGN PATENT DOCUMENTS

JP  B1-2987459  12/1999

(Continued)

OTHER PUBLICATIONS

Ed. By Japan Electric Instrument Manufacturers' Association; *Proper Use of Thermometers* (Revised Edition); Chapter 7; 1997.

(Continued)

*Primary Examiner*—Gail Verbitsky
(74) *Attorney, Agent, or Firm*—Oliff & Berridge, PLC (57) ABSTRACT

A fixed-point cell is provided which can provide a fixed-point in a wide temperature range by changing the fixed-point material. During the use of the fixed-point cell, the fixed-point material can be prevented from being contaminated, and the crucible of the cell can be prevented from being cracked. The fixed-point cell includes: the crucible composed of carbon; the fixed-point material enclosed in the crucible and composed of one of a metal, a eutectic of a metal and carbon, and a eutectic of a metal carbide and carbon; and a woven fabric of graphite fibers containing 10 ppm or lower of impurities and interposed between the crucible and the fixed-point material.

8 Claims, 4 Drawing Sheets

U.S. PATENT DOCUMENTS

| | | | |
|---|---|---|---|
| 7,708,459 B2 * | 5/2010 | Nakano et al. | 374/1 |
| 2003/0026318 A1 * | 2/2003 | Machin | 374/2 |
| 2010/0118911 A1 * | 5/2010 | Lorrette et al. | 374/1 |

FOREIGN PATENT DOCUMENTS

| | | | |
|---|---|---|---|
| JP | B2-3404531 | 5/2003 | |
| JP | A-2005-315642 | 11/2005 | |

OTHER PUBLICATIONS

Y. Yamada et al.; *High-Temperature Metal-Carbon Eutectic Fixed-Point Cells with Improved Robustness*; SICE Annual Conference in Sapporo; Aug. 4-6, 2004; pp. 1027-1030.

* cited by examiner

FIXED-POINT CELL, FIXED-POINT TEMPERATURE REALIZING APPARATUS, AND METHOD OF THERMOMETER CALIBRATION

TECHNICAL FIELD

The present invention relates to a fixed-point cell and a fixed-point temperature realizing apparatus used for calibrating thermometers such as radiation thermometers and thermocouples and to a method of thermometer calibration.

BACKGROUND ART

In calibration of thermometers, the freezing points or melting points of metals are used as defining fixed-points of temperature in the range above room temperature, and a fixed-point cell is used as means for providing the fixed-points. Generally, a graphite crucible containing a cast pure metal as a fixed-point material is used as such a fixed-point cell. A thermometer is calibrated by measuring the temperature inside the fixed-point cell with the thermometer. Specifically, the fixed-point cell is placed inside a variable temperature furnace, and the changes in temperature of the cell when its ambient temperature is increased and decreased are observed. In a state in which the liquid and solid phases of the fixed-point material coexist, the temperature change does not occur due to the latent heat of fusion. The thermometer is calibrated by utilizing this phenomenon (see Non-Patent Document 1).

For example, Patent Document 1 discloses a fixed-point cell including: a crucible composed of carbon; and a fixed-point material enclosed in the crucible and having a eutectic structure of carbon and a metal. Moreover, Patent Document 2 discloses a fixed-point cell including: a crucible composed of carbon; and a fixed-point material enclosed in the crucible and having a eutectic structure of carbon and a carbide or a eutectic structure of carbon and a solid solution of carbon.

However, with the fixed-point cell of any of the above Non-Patent Document 1 and Patent Documents 1 and 2, when the ambient temperature of the crucible placed inside a variable temperature electric furnace is increased and decreased for the purpose of thermometer calibration, the fixed-point material is expanded or contracted, and stress is applied to the crucible. This may cause cracks in the crucible.

Meanwhile, in Non-Patent Document 2, the present inventor has presented a fixed-point cell including layers of a plurality of pyrolytic graphite sheets which is inserted into the gap between a crucible and a fixed-point material composed of a porous material.

However, in the course of ongoing research on the fixed-point cell, the inventor has found the following. The fixed-point cell has a graphite support inserted therein and formed by laying the pyrolytic graphite sheets. The pyrolytic graphite sheets are difficult to purify and contain about 0.1% of phosphorus as an impurity. Therefore, when the fixed-point cell is placed in a variable temperature electric furnace and the ambient temperature of the cell is increased and decreased for the purpose of thermometer calibration, phosphorus diffuses into the fixed-point material in contact with the pyrolytic graphite sheets. Hence, the fixed-point material is contaminated with phosphorus, so that the reproducibility of thermometer calibration decreases significantly.

Patent Document 1: Japanese Patent No. 2987459.

Patent Document 2: Japanese Patent No. 3404531.

Non-Patent Document 1: Chapter 7 of "Proper Use of Thermometers (revised edition)," edited by Japan Electric Instrument Manufacturers' Association, published by Japan Industrial Publishing Co., Ltd., (1997).

Non-Patent Document 2: Y. Yamada and P. Bloembergen, "High-Temperature Metal-Carbon Eutectic Fixed-Point Cells with Improved Robustness", SICE Annual Conference in Sapporo, Aug. 4-6, 2004, pp. 1027-1030.

DISCLOSURE OF THE INVENTION

Problems to be Solved by the Invention

The present invention provides a fixed-point cell which can provide a fixed-point in a wide temperature range by changing the fixed-point material. During the use of the fixed-point cell, the fixed-point material can be prevented from being contaminated, and the crucible can be prevented from being cracked.

The present invention also provides a fixed-point temperature realizing apparatus including the fixed-point cell having the above features.

The present invention further provides a method of thermometer calibration that uses the fixed-point cell having the above features to allow calibration of radiation thermometers, thermocouples, contact thermometers, and other thermometers in a wide temperature range.

Means for Solving the Problems

Specifically, the present invention provides a fixed-point cell including:

a crucible composed of carbon;

a fixed-point material enclosed in the crucible and composed of one of a metal, a eutectic of a metal and carbon, and a eutectic of a metal carbide and carbon; and a woven fabrics of graphite fiber containing 10 ppm or lower of impurities and interposed between the crucible and the fixed-point material.

Moreover, the present invention provides a fixed-point temperature realizing apparatus including:

the fixed-point cell; and a furnace having the fixed-point cell disposed therein and capable of raising or lowering an ambient temperature of the fixed-point cell.

Furthermore, the present invention provides a method of thermometer calibration, the method including: raising or lowering an ambient temperature of the fixed-point cell while changes in temperature of the fixed-point cell are measured with a thermometer; and the thermometer calibration based on the measured changes in temperature.

Effect of the Invention

According to the present invention, a long-life fixed-point cell can be provided which can provide a fixed-point in a wide temperature range by changing the fixed-point material. During the use of the fixed-point cell, the fixed-point material can be prevented from being contaminated, and the crucible can be prevented from being cracked.

Moreover, according to the present invention, a long-life fixed-point temperature realizing apparatus can be provided which is provided with the fixed-point cell having the above features and can calibrate radiation thermometers, thermocouples, and other thermometers by means of interpolation.

Furthermore, according to the present invention, a method of thermometer calibration can be provided which uses the fixed-point cell having the above features, so that the calibration operation for thermometers can be stably performed for a long period of time.

DESCRIPTION OF THE REFERENCE NUMERALS

1 ... fixed-point cell, 2 ... crucible, 3 ... crucible body, 4 ... cavity, 5 ... lid, 6 ... fixed-point material, 8, 9 ... layers of woven fabrics of graphite fibers, 21 ... vertical variable temperature electric furnace, 23, 46, 47, 48 ... heater element, 25, 44 ... core tube, 27, 59 ... protection tube, 30 ... monitoring thermocouple, 31 ... thermocouple to be calibrated, 41 ... horizontal variable temperature electric furnace, 60 ... reference thermocouple, 62 ... radiation thermometer, 71 ... ultra-high-temperature furnace, 73 ... filter radiometer.

BEST MODE FOR CARRYING OUT THE INVENTION

Hereinafter, a fixed-point cell according to an exemplary embodiment of the present invention, a fixed-point temperature realizing apparatus, and a method of thermometer calibration will be described in detail.

Figure 1:
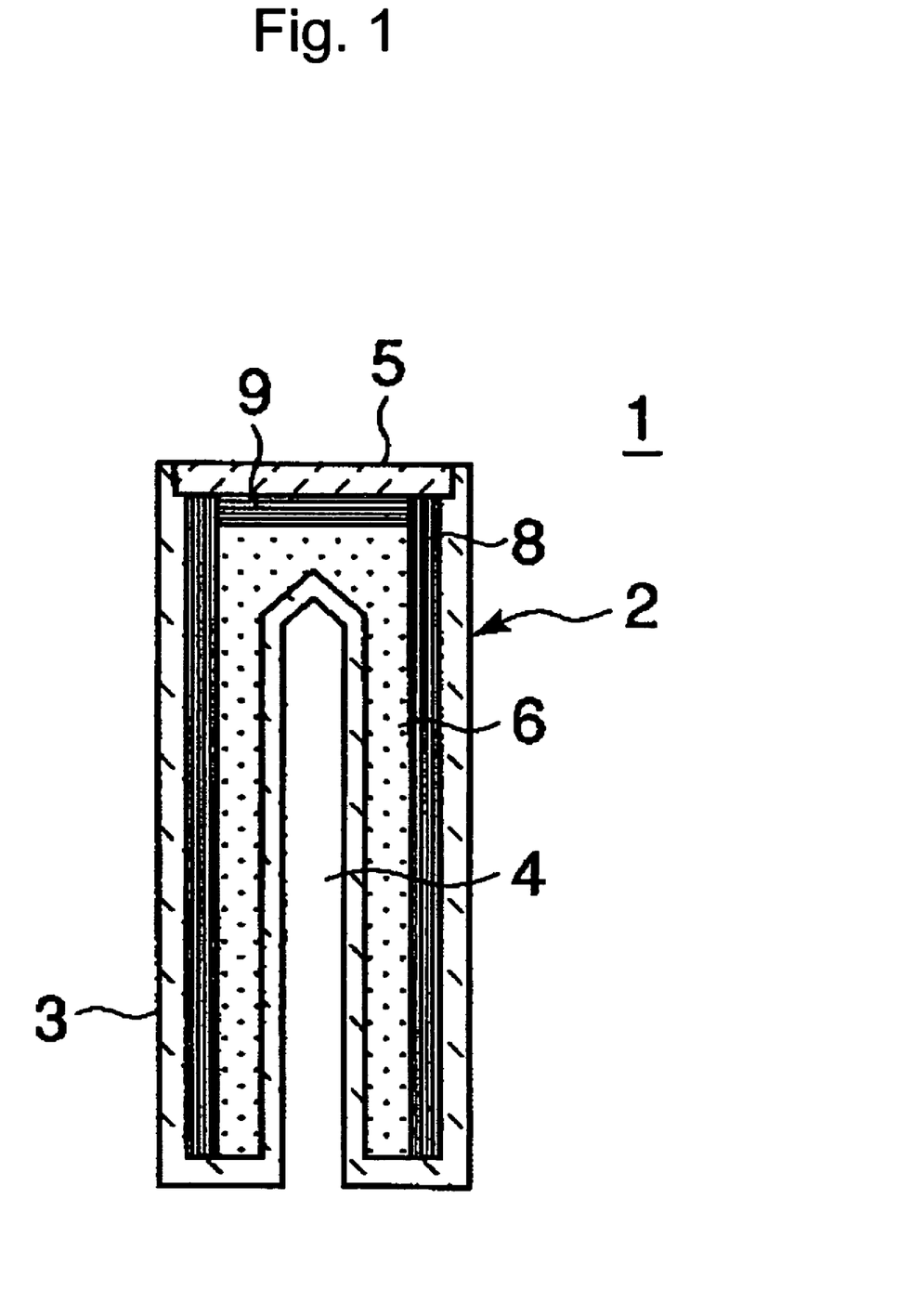
FIG. 1 is a cross-sectional view illustrating a fixed-point cell according to an exemplary embodiment of the present invention.

FIG. 1 is a cross-sectional view illustrating the fixed-point cell according to this exemplary embodiment.

The fixed-point cell 1 includes a crucible 2 composed of carbon such as graphite. The crucible 2 includes: a cylindrical crucible body 3 with a closed end; a cavity 4 formed so as to protrude inward from the closed end of the crucible body 3; and a graphite-made disk-like lid 5 hermetically attached to an opening of the crucible body 3. A fixed-point material 6 is enclosed in the crucible 2 so as to surround a protruding portion defining the blackbody cavity 4. A woven fabric of graphite fibers 7 (or, for example, layers formed by laying a plurality of the woven fabric sheets) containing 10 ppm or lower of impurities such as phosphorus and calcium is inserted between the fixed-point material 6 and the cylindrical crucible body 3 constituting the crucible 2. Layers 8 formed by laying a plurality of woven fabrics of graphite fibers containing 10 ppm or lower of impurities is inserted between the fixed-point material 6 and the graphite made disk-like lid 5 constituting the crucible 2.

The fixed-point material is composed of a metal, a eutectic of a metal and carbon, or a eutectic of a metal carbide and carbon.

Examples of the metal include gallium, indium, tin, zinc, aluminum, silver, gold, and copper.

Examples of the metal used in the metal-carbon eutectic include iron, cobalt, nickel, palladium, rhodium, platinum, ruthenium, iridium, rhenium, and osmium.

Examples of the metal carbide include carbides of boron, molybdenum, vanadium, titanium, zirconium, hafnium, niobium, tungsten, and rare earth elements.

The woven fabric of graphite fibers may have a surface coated with, for example, a high-purity graphite film. For example, a C/C sheet TCC-019 (trade name, product of Toyo Tanso Co., Ltd.) may be used as the woven fabric of graphite fibers coated with a graphite film. A woven fabric of graphite fibers (or, for example, layers formed by laying a plurality of the woven fabrics) may also be disposed inside the crucible body 3 on the side of the opening of the cavity 4.

The above fixed-point cell is produced by, for example, the following method.

First, layers formed by laying a plurality of woven fabrics of graphite fibers containing 10 ppm or lower of impurities is inserted into a graphite-made crucible body having a blackbody cavity and is disposed on the inner surface thereof. Preferably, the layers are inserted into the crucible body so as to protrude from the opening of the crucible body by about several tens of millimeters. Moreover, preferably, before the crucible body is filled with a fixed-point material (to be described later), the empty crucible body having the layers disposed on the inner surface thereof is subjected to heat treatment at, for example, 1500° C. to 2000° C. in a vacuum atmosphere.

Next, a high-purity metal powder (or metal pellets) or a powder mixture of a high-purity metal and high-purity carbon is packed into the crucible body having the layers disposed on the inner surface thereof. Subsequently, the crucible is placed in a vertical electric furnace with the opening of the crucible body left opened. After the atmosphere in the furnace is replaced with an inert gas such as argon gas to create an inert gas atmosphere, or after the furnace is evacuated to create a high vacuum, the metal powder (or the powder mixture) is heated to a temperature higher than its melting point to melt the metal powder or the like. Furthermore, the process of packing the metal powder (or the powder mixture) into the crucible body and heating and melting the metal powder (or the powder mixture) is repeated twice or more, whereby the crucible body is filled with the fixed-point material. Subsequently, layers formed by laying a plurality of woven fabrics of graphite fibers containing 10 ppm or lower of impurities is disposed on the fixed-point material exposed at the opening of the crucible body, and a graphite-made lid is secured to the opening end of the crucible body to enclose the fixed-point material, whereby the fixed-point cell is produced.

Note that the crucible constituting the fixed-point cell of the present invention is not limited to that configured as shown in FIG. 1. For example, the crucible may be composed of a graphite-made cylindrical crucible body and a lid formed integrally with a cavity and mounted to the opening of the crucible body.

Next, with reference to FIG. 2, a description will be given of a fixed-point temperature realizing apparatus provided with the above fixed-point cell.

This fixed-point-temperature realizing apparatus has a vertical variable temperature electric furnace 21. The variable temperature electric furnace 21 includes a cylindrical heat insulator 22 and a cylindrically wound heater element 23 disposed inside the heat insulator 22. The heater element 23 is connected to a heater power source (not shown) having a controller.

An alumina-made closed-end tubular core tube 25 having a flange 24 on its upper end is inserted into the cylindrical heat insulator 22 from the upper end side of the insulator 22 and is supported such that the outer surface of the core tube 25 is surrounded by the heater element 23. The fixed-point cell 1 shown in FIG. 1 is mounted inside the core tube 25 such that the cavity 4 faces upward. A graphite felt (or block) 26 is disposed inside the core tube 25 so as to be located on the upper surface of the fixed-point cell 1.

An alumina-made protection tube 27 is inserted into the cavity 4 of the fixed-point cell 1 so as to pass through the center of the flange 24 of the core tube 25 and the graphite felt 26. A gas introducing tube 28 for introducing an inert gas such as argon is inserted into the core tube 25 so as to pass through the flange 24 of the core tube 25. A discharge tube 29 is connected to the flange 24 of the core tube 25 at one end and to a discharge member (not shown) such as a vacuum pump at the other end.

A monitoring thermocouple 30 is inserted into the heat insulator 22 from the lower end side of the insulator 22 such that the end of the thermocouple 30 is in proximity to the bottom of the core tube 25. The monitoring thermocouple 30 is connected to the controller of the heater power source, and the results of the temperature measurement are inputted to the controller. When the results of the temperature measurement are inputted to the controller, a control signal is outputted from the controller to the heater power source, and the heating temperature of the heater element 23 is thereby controlled.

A description will now be given of a fixed-point calibration method by means of the fixed-point temperature realizing apparatus having the configuration shown in FIG. 2.

First, a thermocouple 31 to be calibrated is inserted into the protection tube 27 that has been inserted into the cavity 4 of the fixed-point cell 1. The vacuum pump (not shown) is operated to discharge the air in the core tube 25 through the discharge tube 29, and an inert gas such as argon gas is introduced into the core tube 25 through the gas introducing tube 29, whereby the atmosphere in the core tube 25 is replaced with the inert gas. By replacing the atmosphere in the core tube 25 with the inert gas as described above, the graphite crucible of the fixed-point cell 1 mounted in the core tube 25 is prevented from being oxidized and burnt off, and also the fixed-point material enclosed in the cell is prevented from being oxidized.

After the atmosphere in the core tube 25 is sufficiently replaced with the inert gas, the heater element 23 is energized by the heater power source (not shown), and the temperature inside the core tube 25 in the heat insulator 1 is raised at a predetermined rate. When the temperature of the core tube 25 reaches a point close to the melting point of the fixed-point material 6 (for example, a fixed-point material composed of a metal) of the fixed-point cell 1 shown in FIG. 1 and mounted inside the core tube 25, the temperature is raised and lowered in the vicinity of the melting point. In this case, when the temperature of the metal exceeds the melting point, the metal is melted. When the temperature becomes lower than the melting point, the metal is solidified.

In the course of melting and solidification of the fixed-point material of the fixed-point cell 1, the temperature of the fixed-point cell 1 is measured with the thermocouple 31 to be calibrated which is inserted into the cavity 4 of the fixed-point cell 1 through the protection tube 27. Then, the thermocouple 31 is calibrated by adjusting the output thereof to the melting point of the fixed-point cell 1.

Therefore, the fixed-point calibration of thermocouples can be performed in a temperature range up to the melting point of the fixed-point material (for example, from room temperature to 1500° C.).

Moreover, as shown in FIG. 1, the fixed-point cell 1 includes the woven fabrics of graphite fibers 8 and 9 (for example, layers formed by laying a plurality of the woven fabrics) serving as a cushioning material interposed between the graphite crucible 2 and the fixed-point material 6. Therefore, during a cooling process after the fixed-point calibration, the stress applied to the crucible 2 due to the difference in thermal expansion between the crucible 2 and the fixed-point material 6 can be absorbed by the layers 8 and 9. In particular, when layers 8 and 9 formed by laying a plurality of the woven fabrics of graphite fibers are used, the stress applied to the crucible 2 due to the difference in the thermal expansion can be more effectively absorbed. Accordingly, the occurrence of cracks in the crucible 2 can be prevented. Moreover, as described above, the amount of impurities such as phosphorus in the woven fabrics of graphite fibers is 10 ppm or lower. Therefore, during the fixed-point calibration, the fixed-point material can be prevented from being contaminated with impurities diffused from the woven fabrics when the fixed-point material is in a molten state. Accordingly, a long-life fixed-point cell can be obtained which exhibits excellent reproducibility of the fixed-point calibration.

Furthermore, the woven fabrics of graphite fibers 8 and 9 (for example, layers formed by laying a plurality of the woven fabrics) interposed between the graphite crucible 2 and the fixed-point material 6 have excellent heat insulating properties in their thickness direction and have excellent heat conduction properties in their plane direction. This can retard the heat flow from the outside to the fixed-point material 6 and can improve the uniformity of the temperature of the fixed-point material 6 inside the crucible. Accordingly, the fixed-point material 6 can be heated uniformly without being affected by the temperature distribution in the vertical variable temperature electric furnace 21.

Fixed-point furnaces, such as the above vertical variable temperature electric furnace, having a fixed-point cell mounted therein are required to have a uniform temperature distribution in order to heat the fixed-point material uniformly. Therefore, furnaces provided with a heat pump and furnaces in which the temperature is controlled in three or five zones are often used. However, such furnaces are expensive and large in size.

As described above, the woven fabrics of graphite fibers 8 and 9 (for example, layers formed by laying a plurality of the woven fabrics) have excellent heat insulating properties in their thickness direction and have excellent heat conduction properties in their plane direction. Therefore, when the woven fabrics of graphite fibers 8 and 9 are interposed between the graphite crucible 2 and the fixed-point material 6, the fixed-point material 6 can be heated uniformly without being affected by the temperature distribution in the vertical variable temperature electric furnace 21. Accordingly, a fixed-point cell 1 can be obtained which can provide the melting-freezing temperature with good reproducibility even when an inexpensive furnace is used.

Figure 2:
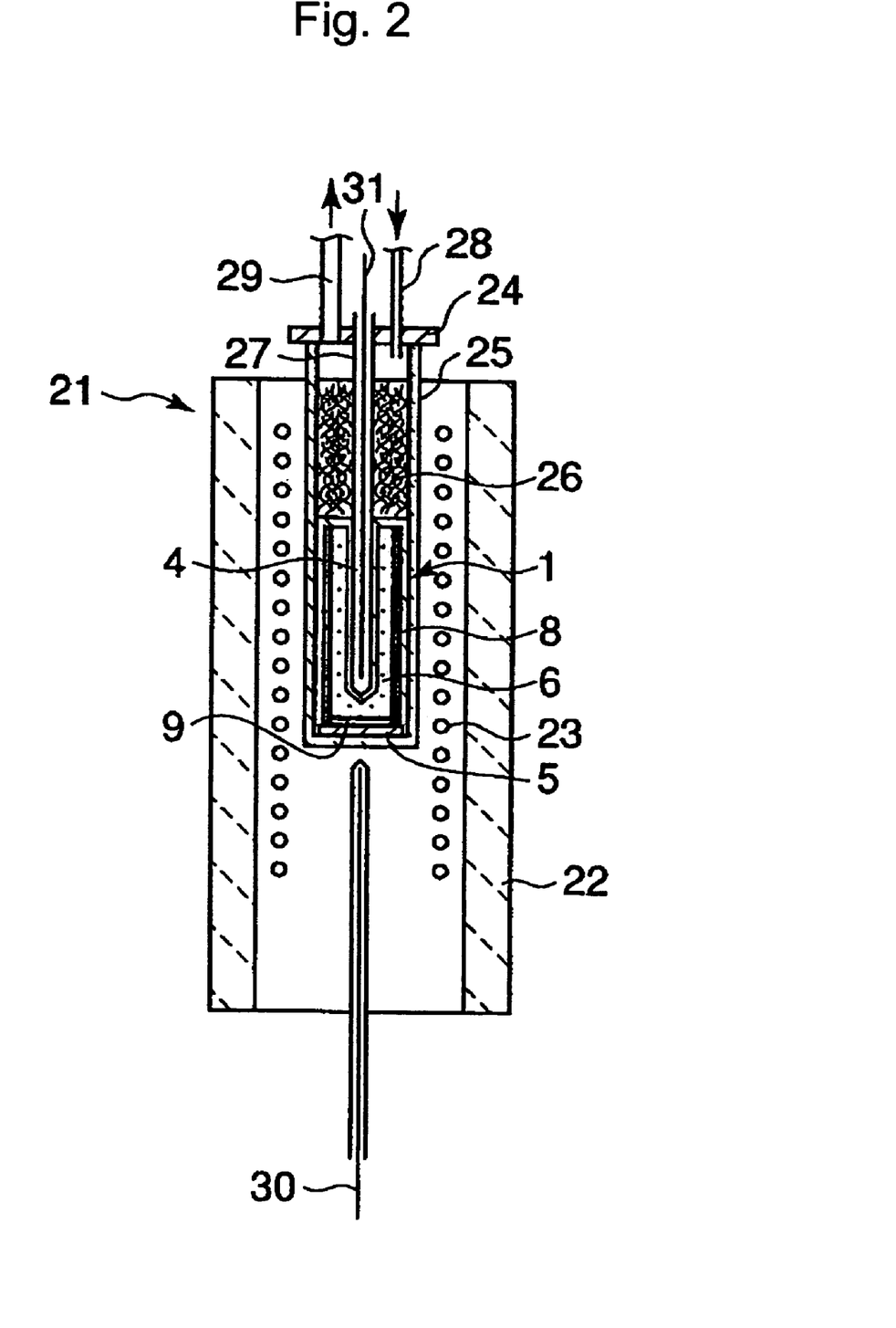
FIG. 2 is a cross-sectional view illustrating a fixed-point temperature realizing apparatus including a vertical variable temperature electric furnace having the fixed-point cell of the exemplary embodiment incorporated therein.

In the fixed-point calibration by the fixed-point temperature realizing apparatus shown in FIG. 2, a thermocouple is used as the thermometer to be calibrated. In addition to this, contact thermometers such as resistance thermometers and fiber thermometers may be used.

Figure 3:
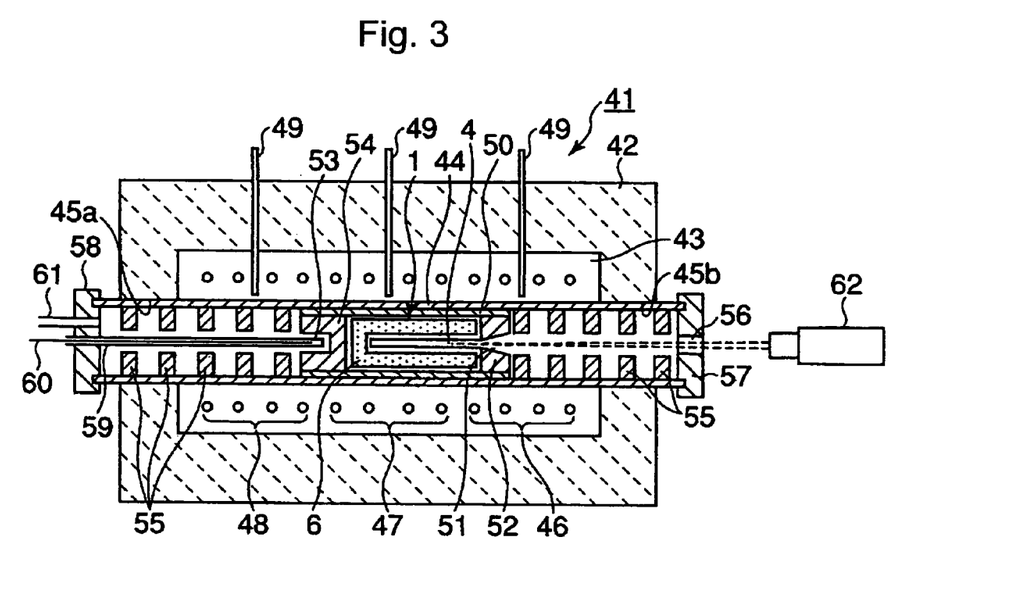
FIG. 3 is a cross-sectional view illustrating a fixed-point temperature realizing apparatus including a horizontal variable temperature electric furnace having the fixed-point cell of the exemplary embodiment incorporated therein.

Next, with reference to FIG. 3, a description will be given of another fixed-point temperature realizing apparatus provided with the above-described fixed-point cell. In FIG. 3, the layers of the woven fabrics of graphite fibers and the lid constituting the fixed-point cell are omitted.

This fixed-point temperature realizing apparatus includes a horizontal variable temperature electric furnace 41. The variable temperature electric furnace 41 is provided with a horizontally disposed rectangular heat insulator 42. The rectangular heat insulator 42 has a rectangular space 43 there inside and has circular openings 45a and 45b on its left and right ends which allow a core tube 44 made of, for example, alumina to pass therethrough. Three rod-like divided SiC heater element sets 46, 47, and 48 (a front zone, a central zone, and a rear zone, respectively, as viewed from the right) are disposed in the rectangular space 43 so as to be placed above and below the core tube 44 and are arranged so as to be orthogonal to the longitudinal direction of the core tube 44. Three control thermocouples 49 pass through the rectangular heat insulator 42 and are inserted into the rectangular space 43 at positions corresponding to the heater element sets 46, 47, and 48. These control thermocouples 49 are connected to a controller of a heater power source for the heater element sets 46, 47, and 48, and the temperature measurement results are inputted into the controller. When the temperature measurement results are inputted into the controller, the controller outputs a control signal to the heater power source, and therefore the heating temperature of each of the heater element sets 46, 47, and 48 is controlled to a preset temperature.

A graphite-made cylindrical body 50 is inserted near the central portion of the core tube 44.

The above-described fixed-point cell 1 shown in FIG. 1 is inserted into the graphite-made cylindrical body 50 such that the cavity 4 of the cell 1 is located on the right edge side. A graphite-made first block 52 having a conical hole 51 is disposed in the graphite-made cylindrical body 50 so as to be adjacent to the right edge of the fixed-point cell 1 and such that the conical hole 51 is aligned with the cavity 4 of the fixed-point cell 1. A graphite-made second block 54 having a circular recess 53 on its left edge side is disposed in the graphite-made cylindrical body 50 so as to be adjacent to the left edge side of the fixed-point cell 1.

A plurality of annular heat insulators 55 are secured to the inner circumferential surface of the core tube 44 at positions left and right of the graphite-made cylindrical body 50 serving as the center.

A first flange 57 having a window hole 56 is fitted to one opening end of the core tube 44 which protrudes from the right end surface of the rectangular heat insulator 42.

A second flange 58 is fitted to the other opening end of the core tube 44 which protrudes from the left end surface of the rectangular heat insulator 42. An alumina-made protection tube 59 passes through the center of the second flange 58 and is inserted into the circular recess 53 of the second block 54 of the core tube 44. A reference thermocouple 60 is inserted into the alumina-made protection tube 59 from the outside. A gas introducing tube 61 for introducing an inert gas such as argon is inserted into and attached to the second flange 58 of the core tube 44.

A description will now be given of a fixed-point calibration method by means of the fixed-point temperature realizing apparatus having the configuration shown in FIG. 3.

First, a radiation thermometer 62 to be calibrated is disposed outside the horizontal variable temperature electric furnace 41 so as to face the window hole 56 of the right-side first flange 57 which is aligned with blackbody cavity 4 of the fixed-point cell 1. Then, an inert gas such as argon gas is introduced into the core tube 44 through the gas introducing tube 61 of the second flange 58 and is discharged from the window hole 56 of the first flange 57, whereby the atmosphere in the core tube 44 is replaced with the inert gas. By replacing the atmosphere in the core tube 44 with the inert gas as described above, the graphite crucible of the fixed-point cell 1 mounted in the core tube 44 is prevented from being oxidized and burnt off, and also the fixed-point material 6 enclosed in the cell 1 is prevented from being oxidized.

After the atmosphere in the core tube 44 is sufficiently replaced with the inert gas, the three rod-like divided heater element sets 46, 47, and 48 (the front zone, the central zone, and the rear zone, respectively, as viewed from the right) are energized by the heater power source (not shown) to generate heat, and the temperature inside the core tube 44 is raised at a predetermined rate. When the temperature of the heater element sets 46, 47, and 48 reaches a point close to the melting point of the fixed-point material 6 (for example, a metal) of the mounted fixed-point cell 1 shown in FIG. 1, the temperature is raised and lowered in the vicinity of the melting point. In this case, when the temperature of the metal exceeds the melting point, the metal is melted. When the temperature becomes lower than the melting point, the metal is solidified.

In the course of melting and solidification of the fixed-point material 6 of the fixed-point cell 1, the radiation thermometer 62 to be calibrated disposed outside the horizontal variable temperature electric furnace 41 detects the radiation from the cavity (blackbody cavity) 4 of the fixed-point cell 1 through the conical hole 51 of the first block 52 and the window hole 56 of the first flange 57, and measures the temperature of the fixed-point cell 1. Then, the radiation thermometer 62 is calibrated by adjusting the output thereof to the melting point of the fixed-point material (for example, a metal) of the fixed-point cell 1.

Therefore, the fixed-point calibration of the radiation thermometer can be performed in a temperature range up to the melting point of the fixed-point material (for example, from room temperature to 1500° C.).

Moreover, as shown in FIG. 1, the fixed-point cell 1 includes the woven fabrics of graphite fibers 8 and 9 (for example, layers formed by laying a plurality of the woven fabric sheets) serving as a cushioning material interposed between the graphite crucible 2 and the fixed-point material 6. Therefore, during a cooling process after the fixed-point calibration, the stress applied to the crucible 2 due to the difference in thermal expansion between the crucible 2 and the fixed-point material 6 can be absorbed by the layers 8 and 9. In particular, when layers 8 and 9 formed by laying a plurality of the woven fabrics of graphite fibers are used, the stress applied to the crucible 2 due to the difference in the thermal expansion can be more effectively absorbed. Accordingly, the occurrence of cracks in the crucible 2 can be prevented. Moreover, as described above, the amount of impurities such as phosphorus in the woven fabrics of graphite fibers is 10 ppm or lower. Therefore, during the fixed-point calibration, the fixed-point material can be prevented from being contaminated with impurities diffused from the woven fabric sheets when the fixed-point material is in a molten state. Accordingly, a long-life fixed-point cell can be obtained which exhibits excellent reproducibility of the fixed-point calibration.

Furthermore, the woven fabrics of graphite fibers 8 and 9 (for example, layers formed by laying a plurality of the woven fabrics) interposed between the graphite crucible 2 and the fixed-point material 6 have excellent heat insulating properties in their thickness direction and have excellent heat conduction properties in their plane direction. This can retard the heat flow from the outside to the fixed-point material 6 and can improve the uniformity of the temperature of the fixed-point material 6 inside the crucible. Therefore, the fixed-point material 6 can be heated uniformly without being affected by the temperature distribution in the horizontal variable temperature electric furnace 41. Accordingly, a fixed-point cell 1 can be obtained which can provide the melting-freezing temperature with good reproducibility.

In the previous exemplary embodiments, the description has been given of the methods for calibrating temperature by means of the fixed-point cell. However, the fixed-point cell is applicable to a method for calibrating radiometers.

Specifically, in the radiometer calibration method, the ambient temperature of the fixed-point cell is raised or lowered while changes in radiance of the radiation from the fixed-point cell are measured by, for example, a spectroradiometer such as a filter radiometer. Then, the radiometer is calibrated based on the measured changes in radiance.

EXAMPLES

Hereinafter, Examples of the present invention are described with reference to the drawings.

Example 1

First, a purified isotropic graphite-made crucible body 2 shown in FIG. 1 was prepared. The body 2 has a cylindrical shape with a closed end and has an outer diameter of 24 mm, a length of 45 mm, and a thickness of 4 mm, and a cylindrical cavity 4 having a diameter of 3 mm and a depth of 34 mm was formed in the closed end portion of the body 2.

Subsequently, layers formed by laying four cut woven fabrics of graphite fibers coated with a high-purity graphite film and having a thickness of 0.5 mm (C/C sheets TCC-019, trade name, product of Toyo Tanso Co., Ltd.) was inserted into the crucible body so as to be placed on the inner surface thereof. At this time, the layers were inserted so as to protrude from the opening of the crucible body by a length of 20 mm. Then, the empty crucible body having the layers disposed therein was placed in a high-temperature vacuum furnace and was subjected to heat treatment at 2000° C. in a vacuum atmosphere for one hour.

Subsequently, the crucible body was removed from the high-temperature vacuum furnace, and high-purity copper pellets with a purity of 99.999% were packed into the crucible body, was returned to the high-temperature vacuum furnace, and was heated to the melting point of copper (1085° C.) in a vacuum atmosphere to melt the copper pellets. The process of packing the high-purity copper pellets into the crucible body and heating and melting the copper pellets was repeated twice, whereby the crucible body was filled with copper serving as the fixed-point material with the layers of the C/C sheets (TCC-019) interposed therebetween. Subsequently, the portion of the layers protruding from the crucible body was cut, and a layers formed by laying four C/C sheets (TCC-019) was disposed in the opening of the crucible body. Then, a graphite-made lid was secured to the opening end of the crucible body to enclose the fixed-point material in the crucible body, whereby a fixed-point cell having the structure shown in FIG. 1 was produced. In this case, the amount of copper was 12.5 g.

Comparative Example 1

The same procedure as in Example 1 was repeated except that the layers of the woven fabrics of graphite fibers was not disposed on the inner surface of the crucible body and on the inner surface of the lid, whereby a fixed-point cell (the amount of copper: 31.8 g) was produced.

The obtained fixed-point cells of Example 1 and Comparative Example 1 were separately inserted into the graphite-made cylindrical body 50 so as to be sandwiched between the graphite-made first and second blocks 51 and 53 constituting the horizontal variable temperature electric furnace 41 shown in FIG. 3. Then, the graphite-made cylindrical body 50 was placed in the center of the core tube 44. To perform temperature measure, a radiation thermometer 62 with a measurement wavelength of 0.65 μm was disposed so as to face the window hole 56 of the right end side first flange 57 and to detect the radiation from the blackbody cavity having a diameter of 3 mm in a field of view of approximately 1.5 mm.

Power was applied to the three rod-like divided heater element sets 46, 47, and 48 (the front zone, the central zone, and the rear zone, respectively, as viewed from the right). In this case, a temperature gradient (a temperature gradient in which the temperature on the side adjacent to the second block 54 is higher than the temperature on the side adjacent to the first block 52) was intentionally generated in the fixed-point cell in the core tube 44, and a melting plateau was measured. The results are shown in FIG. 4.

Figure 4:
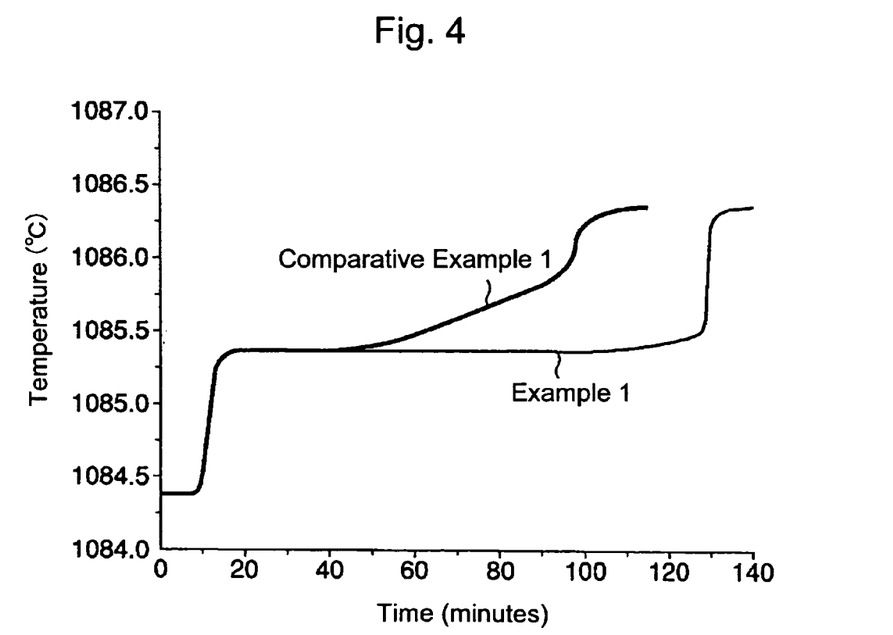
FIG. 4 is a graph showing melting plateaus of fixed-point cells of Example 1 and Comparative Example 1.

As is clear from FIG. 4, with the fixed-point cell of Comparative Example 1, the flat portion of the plateau was short, and the plateau was bent at some point. This is because the fixed-point material (copper) in the crucible was not melted uniformly from the inner periphery of the crucible toward the cavity, i.e., was melted from one side of the crucible (the bottom side of the cavity). In this case, the melting occurred only around the bottom surface of the cavity, and the temperature started increasing earlier.

However, in the fixed-point cell of Example 1, the flat plateau was maintained for a longer period of time. This is because the layers of the C/C sheets (TCC-019) have excellent heat insulating properties in their thickness direction and have excellent heat conduction properties in their plane direction. This can retard the heat flow from the outside to the fixed-point material and can improve the uniformity of the temperature of the fixed-point material inside the crucible. Accordingly, the fixed-point material was melted uniformly without being affected by the temperature gradient.

In addition, with the fixed-point cell of Example 1, the length of the plateau was longer than that in Comparative Example 1 although the enclosed amount of copper was 40% that in Comparative Example 1. Accordingly, when an expensive metal such as gold or silver other than copper is used as the fixed-point material of a fixed-point cell, the amount of such a metal can be reduced by half. This is highly advantageous in reducing cost.

Moreover, four fixed-point cells of Example 1 were produced. One of the four fixed-point cells was used 90 times for the fixed-point calibration of the radiation thermometer. Two of the four fixed-point cells were used only once for the fixed-point calibration of the radiation thermometer. Then, comparisons were made between their plateau shapes and between their fixed-points of temperature. In addition, the appearance of the final one of the fixed-point cells which was not used for the fixed-point calibration of the radiation thermometer was compared with the appearances of the other fixed-point cells. In the fixed-point cell used 90 times for the fixed-point calibration of the radiation thermometer, the deterioration in the shape of the plateau, the change in the fixed-point of temperature, and the deterioration in the appearance of the crucible, such as the occurrence of cracks, were not found.

Example 2

A graphite-made crucible body was prepared in which layers formed by laying four C/C sheets (TCC-019) and having the same size as that in Example 1 was disposed on the inner surface so as to protrude from the opening by a length of 20 mm. Subsequently, the empty crucible body having the layers disposed therein was place in a high-temperature vacuum furnace and was subjected to heat treatment at 2000° C. in a vacuum atmosphere for one hour. Then, the crucible body was removed from the high-temperature vacuum furnace. High-purity palladium with a purity of 99.999% and high-purity carbon powder with a purity of 99.999% were mixed at a hypoeutectic composition of 1 wt. % and were packed into the crucible body. The crucible body was returned to the high-temperature vacuum furnace and was heated to the melting point of the palladium-carbon eutectic (1,492° C.) in a vacuum atmosphere to melt the eutectic. During the melting process, carbon was dissolved from the crucible body and the layers of the C/C sheets (TCC-019) and was saturated at the palladium-carbon eutectic composition. Furthermore, the process of packing the powder mixture of the hypoeutectic composition into the crucible body and heating and melting the mixture was repeated seven times, whereby the crucible body was filled with the fixed-point material composed of the palladium-carbon eutectic with the layers of the C/C sheets (TCC-019) interposed therebetween. Subsequently, the portion of the layers protruding from the crucible body was cut, and layers formed by laying four C/C sheets (TCC-019) was disposed in the opening of the crucible body. Then, a graphite-made lid was secured to the opening end of the crucible body to enclose the fixed-point material in the crucible body, whereby a fixed-point cell having the structure shown in FIG. 1 was produced. In this case, the amount of palladium used in the palladium-carbon eutectic was 37 g.

The same procedure was repeated to produce three fixed-point cells having the palladium-carbon eutectic serving as the fixed-point material enclosed therein.

Comparative Example 2

The same procedure as in Example 2 was repeated except that the layers of the woven fabrics of graphite fibers was not disposed on the inner surface of the crucible body and on the inner surface of the lid, whereby a fixed-point cell was produced.

One of the four obtained fixed-point cells of Example 2 was incorporated into the fixed-point temperature realizing apparatus including the horizontal variable temperature electric furnace 41 shown in FIG. 3, and the fixed-point calibration of a radiation thermometer with a measurement wavelength of 0.65 μm was repeated 30 times by means of the same method as in Example 1. Two of the four fixed-point cells were used only once for the fixed-point calibration of the radiation thermometer. Then, comparisons were made between their plateau shapes and between their fixed-points of temperature. In addition, the appearance of the final one of the fixed-point cells which was not used for fixed-point calibration of the radiation thermometer was compared with the appearances of the other fixed-point cells. In the fixed-point cell used 30 times for the fixed-point calibration of the radiation thermometer, the deterioration in the shape of the plateau, the change in the fixed-point of temperature, and the deterioration in the appearance of the crucible, such as the occurrence of cracks, were not found.

The fixed-point cell of Comparative Example 2 was incorporated into the horizontal variable temperature electric furnace 41 shown in FIG. 3, and the fixed-point calibration of the radiation thermometer with a measurement wavelength of 0.65 μm was repeated a plurality of times by means of the same method as in Example 1. The results showed that after the calibration of the radiation thermometer was repeated 10 times, cracks were formed in the outer wall of the crucible so as to surround the crucible.

Example 3

First, a purified isotropic graphite-made crucible body 2 shown in FIG. 1 was prepared. The body 2 has a cylindrical shape with a closed end and has an outer diameter of 46 mm, a length of 300 mm, and a thickness of 4 mm, and a cylindrical cavity 4 having a diameter of 9 mm and a depth of 270 mm was formed in the closed end portion of the body 2. Specifically, the prepared crucible body has a larger outer diameter and a larger length that those in Example 1.

Subsequently, a layers formed by laying four C/C sheets (TCC-019) having a thickness of 0.5 mm was inserted into the crucible body so as to be placed on the inner surface thereof. At this time, the layers were inserted so as to protrude from the opening of the crucible body by a length of 20 mm. Then, the empty crucible body having the layers disposed therein was placed in a vertical single-zone furnace and was subjected to heat treatment at 1500° C. in an argon atmosphere for three hours.

Subsequently, the crucible body was removed from the furnace. High-purity cobalt shots of 1 mm per side with a purity of 99.999% and high-purity carbon powder with a purity of 99.999% were mixed at a hypoeutectic composition of 1 wt. % and were packed into the crucible body. The crucible body was returned to the furnace and was heated to the melting point of the eutectic in an argon atmosphere to melt the eutectic. During the melting process, carbon was dissolved from the crucible body and the layers of the C/C sheets (TCC-019) and was saturated at the cobalt-carbon eutectic composition. Furthermore, the process of packing the mixture into the crucible body and heating and melting the mixture was repeated 12 times, whereby the crucible body was filled with the fixed-point material composed of the cobalt-carbon eutectic with the layers of the C/C sheets (TCC-019) interposed therebetween. Subsequently, the portion of the layers protruding from the crucible body was cut, and layers formed by laying four C/C sheets (TCC-019) were disposed in the opening of the crucible body. Then, a graphite-made lid was secured to the opening end of the crucible body to enclose the fixed-point material in the crucible body, whereby a fixed-point cell having the structure shown in FIG. 1 was produced. In this case, the amount of cobalt used in the cobalt-carbon eutectic was 200 g.

The obtained fixed-point cell of Example 3 was incorporated into the fixed-point temperature realizing apparatus including the vertical variable temperature electric furnace 21 shown in FIG. 2, and fixed-point calibration of a thermocouple 31 was performed by means of the same method as that described in the exemplary embodiment. Specifically, a platinum-palladium thermocouple serving as the thermocouple 31 to be calibrated was inserted into the alumina-made protection tube 27 that has been inserted into the cavity 4 of the fixed-point cell 1, and the plateau of melting-solidification was observed. The results showed that although the single-zone heating element was used, the reproducibility of the plateau was 0.05° C. or less.

In addition, after the fixed-point cell of Example 3 was used 20 times for the fixed-point calibration of the platinum-palladium thermocouple, the appearance of the fixed-point cell was observed. The results showed that leakage of the metal caused by the occurrence of cracks in the outer wall was not found.

Example 4

First, a purified isotropic graphite-made crucible body 2 shown in FIG. 1 was prepared. The body 2 has a cylindrical shape with a closed end and has an outer diameter of 24 mm, a length of 100 mm, and a thickness of 4 mm, and a cylindrical cavity 4 having a diameter of 8 mm and a depth of 90 mm was formed in the closed end portion of the body 2. Specifically, the prepared crucible body has the blackbody cavity having a diameter greater than that in Example 1.

Subsequently, layers formed by laying four C/C sheets (TCC-019) having a thickness of 0.5 mm was inserted into the crucible body so as to be placed on the inner surface thereof. Then, a fixed-point cell having the structure shown in FIG. 1 was produced by using an ultra-high temperature furnace of a joule heating type provided with a heater composed of a high-purity graphite ring. In this fixed-point cell, a fixed-point material composed of a titanium carbide-carbon eutectic was enclosed therein by means of a method similar to that in Example 2. In this case, the amount of titanium carbide in the titanium carbide-carbon eutectic was 31 g.

Figure 5:
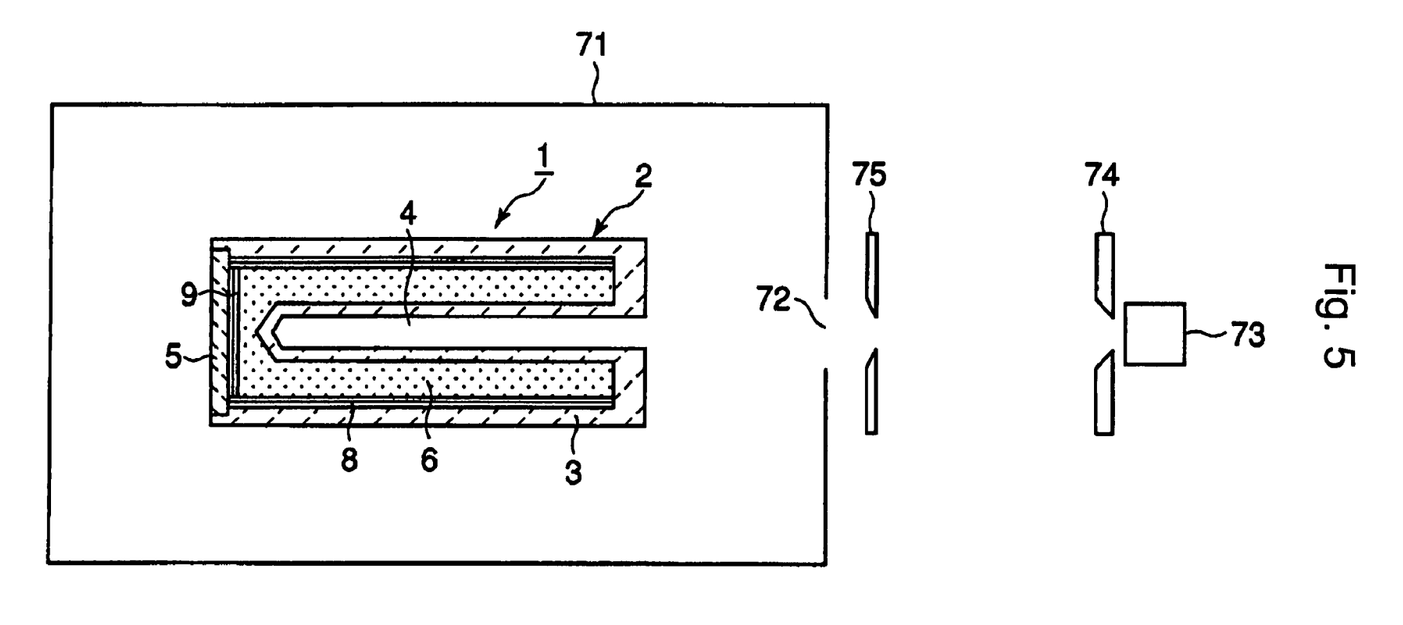
FIG. 5 is a schematic view illustrating a fixed-point temperature realizing apparatus used in Example 4, the apparatus including an ultra-high temperature furnace.

The obtained fixed-point cell of Example 4 was incorporated into a fixed-point temperature realizing apparatus as shown in FIG. 5 and was used for fixed-point calibration of a filter radiometer. Specifically, the ultra-high-temperature furnace 71 of the joule heating type used for producing the fixed-point cell was disposed horizontally, and the fixed-point cell 1 was disposed in the ultra-high-temperature furnace 71 such that the blackbody cavity 4 faces a window hole 72 of the ultra-high-temperature furnace 71. The filter radiometer 73 with a measurement wavelength of 0.8 μm was disposed outside the ultra-high-temperature furnace 71 so as to be spaced apart from the window hole 72 by a predetermined distance. The filter radiometer 73 has a first opening 74 of a diameter of 3 mm provided in proximity to the surface on the ultra-high-temperature furnace 71 side. A second opening 75 of a diameter of 3 mm attached to a water-cooled holder was placed between the first opening 74 and the window hole 72 of the ultra-high-temperature furnace 71 so as to be in proximity to the window hole 72.

In this fixed-point temperature realizing apparatus, the distance between the second opening 75 and the opening of the blackbody cavity 4 of the fixed-point cell 1 was set to 250 mm, and the distance between the first opening 74 and the second opening 75 was set to 500 mm. Then, the radiance of the 8-mm blackbody cavity 4 of the fixed-point cell 1 was measured during melting-freezing by means of the filter radiometer 73 without using an imaging optical system.

The results showed that the reproducibility of the radiance was 0.05% or less. Moreover, the occurrence of cracks and the like in the outer wall of the fixed-point cell was not found. In addition, even when the length of the fixed-point cell was further increased, the radiance measurement could be performed with good reproducibility without being affected by the temperature distribution. Accordingly, a light source for photometric and radiometric standards can be provided without increasing the size of the ultra-high temperature furnace.

The invention claimed is:

1. A fixed-point cell comprising:
   a crucible composed of carbon;
   a fixed-point material enclosed in the crucible and composed of one of a metal, a eutectic of a metal and carbon, and a eutectic of a metal carbide and carbon; and
   a woven fabric of graphite fibers containing 10 ppm or lower of impurities and interposed between the crucible and the fixed-point material.

2. The fixed-point cell according to claim 1, wherein the woven fabric of graphite fibers is layers formed by laying a plurality of the woven fabrics.

3. The fixed-point cell according to claim 1, wherein the metal is any one of gallium, indium, tin, zinc, aluminum, silver, gold, and copper.

4. The fixed-point cell according to claim 1, wherein the metal used in the metal-carbon eutectic is any one of iron, cobalt, nickel, palladium, rhodium, platinum, ruthenium, iridium, rhenium, and osmium.

5. The fixed-point cell according to claim 1, wherein the metal carbide is any one of carbides of boron, molybdenum, vanadium, titanium, zirconium, hafnium, niobium, tungsten, and rare earth elements.

6. A fixed-point temperature realizing apparatus comprising:
   the fixed-point cell according to claim 1; and
   a furnace having the fixed-point cell disposed therein and capable of raising or lowering an ambient temperature of the fixed-point cell.

7. A method of thermometer calibration, the method comprising: raising or lowering an ambient temperature of the fixed-point cell according to claim 1 while changes in temperature of the fixed-point cell are measured with a thermometer; and calibrating the thermometer based on the measured changes in temperature.

8. The method of thermometer calibration according to claim 7, wherein the thermometer is a radiation thermometer, a thermocouple, and a resistance thermometer.

* * * * *